(12) United States Patent
Damera-Venkata

(10) Patent No.: US 7,522,177 B2
(45) Date of Patent: Apr. 21, 2009

(54) IMAGE DISPLAY SYSTEM AND METHOD

(75) Inventor: Niranjan Damera-Venkata, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 522 days.

(21) Appl. No.: 10/931,923

(22) Filed: Sep. 1, 2004

(65) Prior Publication Data

US 2006/0044294 A1    Mar. 2, 2006

(51) Int. Cl.
G09G 5/02 (2006.01)
G09G 5/10 (2006.01)

(52) U.S. Cl. .................. 345/694; 345/691; 345/696

(58) Field of Classification Search .......... 345/690–698
See application file for complete search history.

(56) References Cited

U.S. PATENT DOCUMENTS

| | | |
|---|---|---|
| 4,373,784 A | 2/1983 | Nonomura et al. |
| 4,662,746 A | 5/1987 | Hornbeck |
| 4,811,003 A | 3/1989 | Strathman et al. |
| 4,956,619 A | 9/1990 | Hornbeck |
| 5,061,049 A | 10/1991 | Hornbeck |
| 5,083,857 A | 1/1992 | Hornbeck |
| 5,146,356 A | 9/1992 | Carlson |
| 5,317,409 A | 5/1994 | Macocs |
| 5,386,253 A | 1/1995 | Fielding |
| 5,490,009 A | 2/1996 | Venkateswar et al. |
| 5,557,353 A | 9/1996 | Stahl |
| 5,689,283 A | 11/1997 | Shirochi |
| 5,912,773 A | 6/1999 | Barnett et al. |
| 5,920,365 A | 7/1999 | Eriksson |
| 5,953,148 A | 9/1999 | Moseley et al. |
| 5,978,518 A | 11/1999 | Oliyide et al. |

(Continued)

FOREIGN PATENT DOCUMENTS

EP    0712243    5/1996

(Continued)

OTHER PUBLICATIONS

L.M. Chen and S. Hasagawa, "Visual Resolution Limits for Color Matrix Displays", "One Panel Projectors" Displays, Technologies, and Applications, vol. 13, pp. 221-226, 1992.

(Continued)

*Primary Examiner*—Kevin M Nguyen

(57) ABSTRACT

A method of displaying an image is provided. The method comprises receiving interlaced image data for the image where the interlaced data comprises a first field and a second field, generating a first sub-frame and a second sub-frame for the image using the first field, generating a third sub-frame and a fourth sub-frame for the image using the second field, and alternating between displaying the first sub-frame in a first position at a first time, displaying the second sub-frame in a second position horizontally offset from the first position at a second time that is subsequent to the first time, displaying the third sub-frame in a third position vertically offset from the first position at a third time that is subsequent to the second time, and displaying the fourth sub-frame in a fourth position horizontally and vertically offset from the first position at a fourth time that is subsequent to the second time.

19 Claims, 6 Drawing Sheets

U.S. PATENT DOCUMENTS

| | | |
|---|---|---|
| 6,025,951 A | 2/2000 | Swart et al. |
| 6,067,143 A | 5/2000 | Tomita |
| 6,104,375 A | 8/2000 | Lam |
| 6,118,584 A | 9/2000 | Van Berkel et al. |
| 6,141,039 A | 10/2000 | Poetsch |
| 6,184,969 B1 | 2/2001 | Fergason |
| 6,219,017 B1 | 4/2001 | Shimada et al. |
| 6,239,783 B1 | 5/2001 | Hill et al. |
| 6,243,055 B1 | 6/2001 | Fergason |
| 6,313,888 B1 | 11/2001 | Tabata |
| 6,384,816 B1 | 5/2002 | Tabata |
| 6,393,145 B2 | 5/2002 | Betrisey et al. |
| 6,522,356 B1 | 2/2003 | Watanabe |
| 6,657,603 B1 | 12/2003 | Demetrescu et al. |
| 2003/0020809 A1 | 1/2003 | Gibbon et al. |
| 2003/0076325 A1 | 4/2003 | Thrasher |
| 2003/0090597 A1 | 5/2003 | Katoh et al. |
| 2005/0128450 A1 | 6/2005 | Schroeder |

FOREIGN PATENT DOCUMENTS

| | | |
|---|---|---|
| EP | 0790514 | 8/1997 |
| EP | 1001306 A2 | 5/2000 |
| EP | 1388840 | 2/2004 |

OTHER PUBLICATIONS

A. Yasuda et al., "FLC Wobbling for High-Resolution Projectors", Journal of the SID 5/3 1997, pp. 299-305.

T. Tokita et al., "P-108: FLC Resolution-Enhancing Device for Projection Displays", SID 02 Digest 2002, pp. 638-641.

D.H. Kelly, "Motion and Vision—II. Stabilized Spatio-Temporal Threshold Surface," Journal of the Optical Society of America, vol. 69, No. 10, Oct. 1979.

Candice H. Brown Elliot et al., "Color Subpixel Rendering Projectors and Flat Panel Displays"; SMPTE Advanced Motion Imaging Conference; Feb. 27-Mar. 1, 2003; pp. 1-4.

Diana C. Chen, "Display Resolution Enhancement with Optical Scanners" Applied Optics, vol. 40, No. 5, Feb. 10, 2001, pp. 636-643.

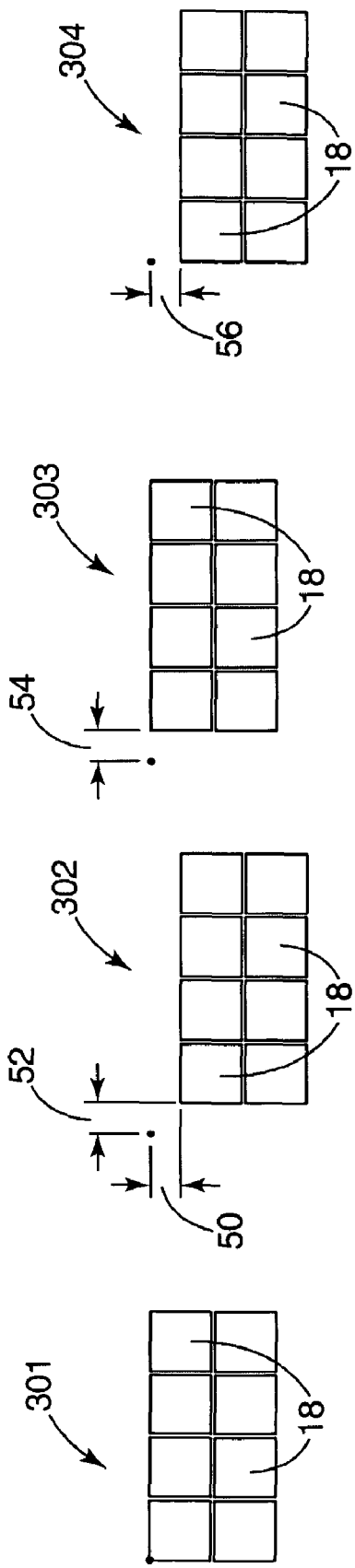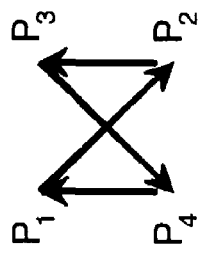

IMAGE DISPLAY SYSTEM AND METHOD

CROSS-REFERENCE TO RELATED APPLICATIONS

This application is related to U.S. patent application Ser. No. 10/213,555, filed on Aug. 7, 2002, entitled IMAGE DISPLAY SYSTEM AND METHOD; U.S. patent application Ser. No. 10/242,195, filed on Sep. 11, 2002, entitled IMAGE DISPLAY SYSTEM AND METHOD; U.S. patent application Ser. No. 10/242,545, filed on Sep. 11, 2002, entitled IMAGE DISPLAY SYSTEM AND METHOD; U.S. patent application Ser. No. 10/631,681, filed Jul. 31, 2003, entitled GENERATING AND DISPLAYING SPATIALLY OFFSET SUB-FRAMES; U.S. patent application Ser. No. 10/632,042, filed Jul. 31, 2003, entitled GENERATING AND DISPLAYING SPATIALLY OFFSET SUB-FRAMES; U.S. patent application Ser. No. 10/672,845, filed Sep. 26, 2003, entitled GENERATING AND DISPLAYING SPATIALLY OFFSET SUB-FRAMES; U.S. patent application Ser. No. 10/672,544, filed Sep. 26, 2003, entitled GENERATING AND DISPLAYING SPATIALLY OFFSET SUB-FRAMES; U.S. patent application Ser. No. 10/697,605, filed Oct. 30, 2003, entitled GENERATING AND DISPLAYING SPATIALLY OFFSET SUB-FRAMES ON A DIAMOND GRID; U.S. patent application Ser. No. 10/696,888, filed Oct. 30, 2003, entitled GENERATING AND DISPLAYING SPATIALLY OFFSET SUB-FRAMES ON DIFFERENT TYPES OF GRIDS; U.S. patent application Ser. No. 10/697,830, filed Oct. 30, 2003, entitled IMAGE DISPLAY SYSTEM AND METHOD; U.S. patent application Ser. No. 10/750,591, filed Dec. 31, 2003, entitled DISPLAYING SPATIALLY OFFSET SUB-FRAMES WITH A DISPLAY DEVICE HAVING A SET OF DEFECTIVE DISPLAY PIXELS; U.S. patent application Ser. No. 10/768,621, filed Jan. 30, 2004, entitled GENERATING AND DISPLAYING SPATIALLY OFFSET SUB-FRAMES; U.S. patent application Ser. No. 10/768,215, filed Jan. 30, 2004, entitled DISPLAYING SUB-FRAMES AT SPATIALLY OFFSET POSITIONS ON A CIRCLE; U.S. patent application Ser. No. 10/821,135, filed Apr. 8, 2004, entitled GENERATING AND DISPLAYING SPATIALLY OFFSET SUB-FRAMES; U.S. patent application Ser. No. 10/821,130, filed Apr. 8, 2004, entitled GENERATING AND DISPLAYING SPATIALLY OFFSET SUB-FRAMES; U.S. patent application Ser. No. 10/820,952, filed Apr. 8, 2004, entitled GENERATING AND DISPLAYING SPATIALLY OFFSET SUB-FRAMES; U.S. patent application Ser. No. 10/864,125, filed Jun. 9, 2004, entitled GENERATING AND DISPLAYING SPATIALLY OFFSET SUB-FRAMES; U.S. patent application Ser. No. 10/868,719, filed Jun. 15, 2004, entitled GENERATING AND DISPLAYING SPATIALLY OFFSET SUB-FRAMES, and U.S. patent application Ser. No. 10/868,638, filed Jun. 15, 2004, entitled GENERATING AND DISPLAYING SPATIALLY OFFSET SUB-FRAMES. Each of the above U.S. Patent Applications is assigned to the assignee of the present invention, and is hereby incorporated by reference herein.

BACKGROUND

A conventional system or device for displaying an image, such as a display, projector, or other imaging system, produces a displayed image by addressing an array of individual picture elements or pixels arranged in horizontal rows and vertical columns. A resolution of the displayed image is defined as the number of horizontal rows and vertical columns of individual pixels forming the displayed image. The resolution of the displayed image is affected by a resolution of the display device itself as well as a resolution of the image data processed by the display device and used to produce the displayed image.

Typically, to increase a resolution of the displayed image, the resolution of the display device as well as the resolution of the image data used to produce the displayed image must be increased. Increasing a resolution of the display device, however, increases a cost and complexity of the display device. In addition, higher resolution image data may not be available and/or may be difficult to generate.

It would be desirable to be able to enhance the display of various types of graphical images including natural images and high contrast images such as business graphics.

SUMMARY

One form of the present invention provides a method of displaying an image is provided. The method comprises receiving interlaced image data for the image where the interlaced data comprises a first field and a second field, generating a first sub-frame and a second sub-frame for the image using the first field, generating a third sub-frame and a fourth sub-frame for the image using the second field, and alternating between displaying the first sub-frame in a first position at a first time, displaying the second sub-frame in a second position horizontally offset from the first position at a second time that is subsequent to the first time, displaying the third sub-frame in a third position vertically offset from the first position at a third time that is subsequent to the second time, and displaying the fourth sub-frame in a fourth position horizontally and vertically offset from the first position at a fourth time that is subsequent to the second time.

BRIEF DESCRIPTION OF THE DRAWINGS

FIGS. 3A-3E are schematic diagrams illustrating the display of four sub-frames according to one embodiment of the present invention.

DETAILED DESCRIPTION

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

I. Spatial and Temporal Shifting of Sub-frames

Some display systems, such as some digital light projectors, may not have sufficient resolution to display some high resolution images. Such systems can be configured to give the appearance to the human eye of higher resolution images by displaying spatially and temporally shifted lower resolution images. The lower resolution images are referred to as sub-frames. A problem of sub-frame generation, which is addressed by embodiments of the present invention, is to determine appropriate values for the sub-frames so that the displayed sub-frames are close in appearance to how the high-resolution image from which the sub-frames were derived would appear if directly displayed.

One embodiment of a display system that provides the appearance of enhanced resolution through temporal and spatial shifting of sub-frames is described in the U.S. patent applications cited above, and is summarized below with reference to FIGS. 1-4E.

Figure 1:
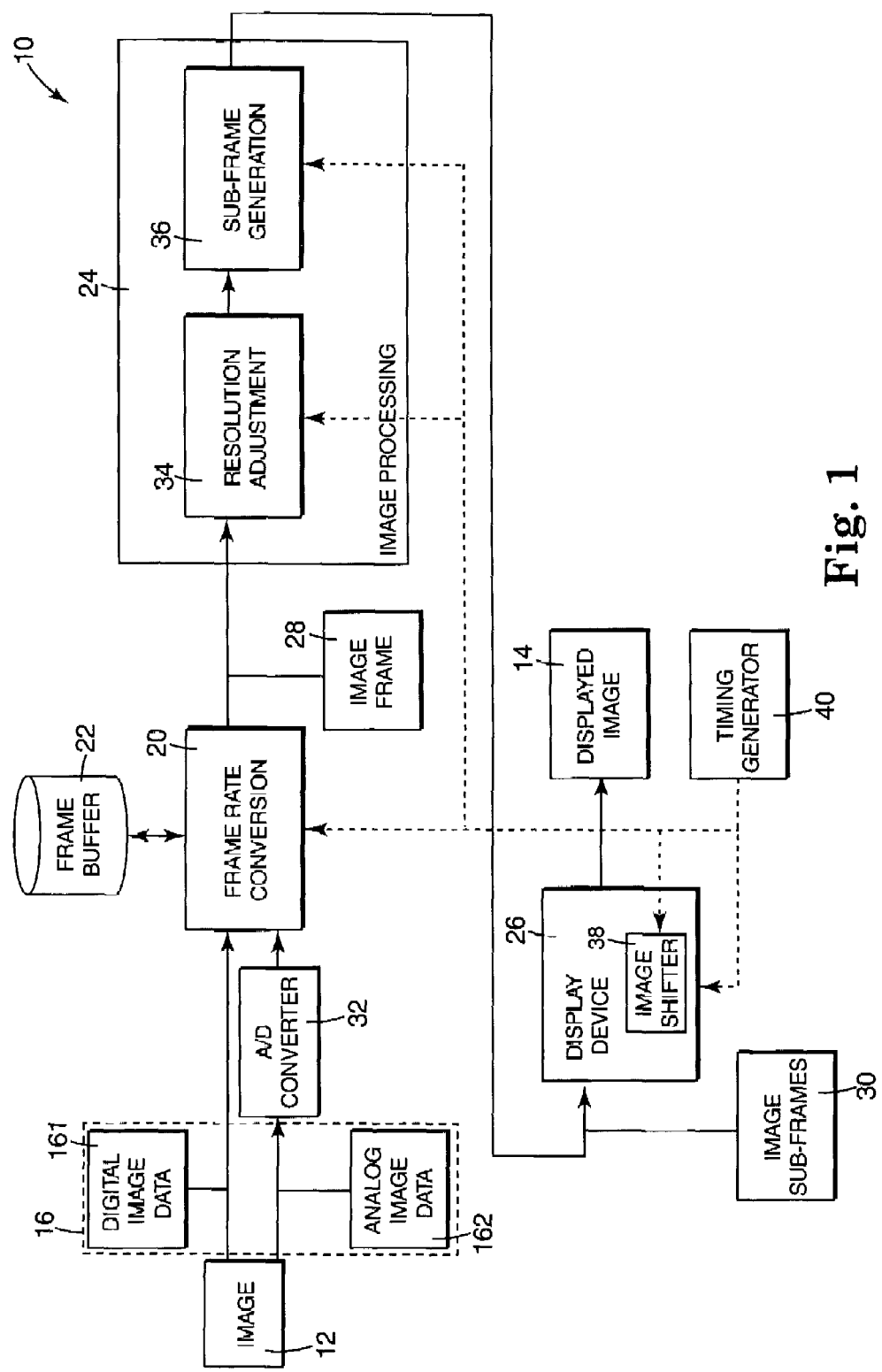
FIG. 1 is a block diagram illustrating an image display system according to one embodiment of the present invention.

FIG. 1 is a block diagram illustrating an image display system 10 according to one embodiment of the present invention. Image display system 10 facilitates processing of an image 12 to create a displayed image 14. Image 12 is defined to include any pictorial, graphical, and/or textural characters, symbols, illustrations, and/or other representation of information. Image 12 is represented, for example, by image data 16. Image data 16 includes individual picture elements or pixels of image 12. While one image is illustrated and described as being processed by image display system 10, it is understood that a plurality or series of images may be processed and displayed by image display system 10.

In one embodiment, image display system 10 includes a frame rate conversion unit 20 and an image frame buffer 22, an image processing unit 24, and a display device 26. As described below, frame rate conversion unit 20 and image frame buffer 22 receive and buffer image data 16 for image 12 to create an image frame 28 for image 12. Image processing unit 24 processes image frame 28 to define one or more image sub-frames 30 for image frame 28, and display device 26 temporally and spatially displays image sub-frames 30 to produce displayed image 14.

Image display system 10, including frame rate conversion unit 20 and/or image processing unit 24, includes hardware, software, firmware, or a combination of these. In one embodiment, one or more components of image display system 10, including frame rate conversion unit 20 and/or image processing unit 24, are included in a computer, computer server, or other microprocessor-based system capable of performing a sequence of logic operations. In addition, processing can be distributed throughout the system with individual portions being implemented in separate system components.

Image data 16 may include digital image data 161 or analog image data 162. To process analog image data 162, image display system 10 includes an analog-to-digital (A/D) converter 32. As such, A/D converter 32 converts analog image data 162 to digital form for subsequent processing. Thus, image display system 10 may receive and process digital image data 161 and/or analog image data 162 for image 12.

Frame rate conversion unit 20 receives image data 16 for image 12 and buffers or stores image data 16 in image frame buffer 22. More specifically, frame rate conversion unit 20 receives image data 16 representing individual lines or fields of image 12 and buffers image data 16 in image frame buffer 22 to create image frame 28 for image 12. Image frame buffer 22 buffers image data 16 by receiving and storing all of the image data for image frame 28, and frame rate conversion unit 20 creates image frame 28 by subsequently retrieving or extracting all of the image data for image frame 28 from image frame buffer 22. As such, image frame 28 is defined to include a plurality of individual lines or fields of image data 16 representing an entirety of image 12. Thus, image frame 28 includes a plurality of columns and a plurality of rows of individual pixels representing image 12.

Frame rate conversion unit 20 and image frame buffer 22 can receive and process image data 16 as progressive image data and/or interlaced image data. With progressive image data, frame rate conversion unit 20 and image frame buffer 22 receive and store sequential fields of image data 16 for image 12. Thus, frame rate conversion unit 20 creates image frame 28 by retrieving the sequential fields of image data 16 for image 12. With interlaced image data, frame rate conversion unit 20 and image frame buffer 22 receive and store odd fields and even fields of image data 16 for image 12. For example, all of the odd fields of image data 16 are received and stored and all of the even fields of image data 16 are received and stored. As such, frame rate conversion unit 20 de-interlaces image data 16 and creates image frame 28 by retrieving the odd and even fields of image data 16 for image 12.

Image frame buffer 22 includes memory for storing image data 16 for one or more image frames 28 of respective images 12. Thus, image frame buffer 22 constitutes a database of one or more image frames 28. Examples of image frame buffer 22 include non-volatile memory (e.g., a hard disk drive or other persistent storage device) and may include volatile memory (e.g., random access memory (RAM)).

By receiving image data 16 at frame rate conversion unit 20 and buffering image data 16 with image frame buffer 22, input timing of image data 16 can be decoupled from a timing requirement of display device 26. More specifically, since image data 16 for image frame 28 is received and stored by image frame buffer 22, image data 16 can be received as input at any rate. As such, the frame rate of image frame 28 can be converted to the timing requirement of display device 26. Thus, image data 16 for image frame 28 can be extracted from image frame buffer 22 at a frame rate of display device 26.

In one embodiment, image processing unit 24 includes a resolution adjustment unit 34 and a sub-frame generation unit 36. As described below, resolution adjustment unit 34 receives image data 16 for image frame 28 and adjusts a resolution of image data 16 for display on display device 26, and sub-frame generation unit 36 generates a plurality of image sub-frames 30 for image frame 28. More specifically, image processing unit 24 receives image data 16 for image frame 28 at an original resolution and processes image data 16 to increase, decrease, and/or leave unaltered the resolution of image data 16. Accordingly, with image processing unit 24, image display system 10 can receive and display image data 16 of varying resolutions.

Sub-frame generation unit 36 receives and processes image data 16 for image frame 28 to define a plurality of image sub-frames 30 for image frame 28. If resolution adjustment unit 34 has adjusted the resolution of image data 16, sub-frame generation unit 36 receives image data 16 at the adjusted resolution. The adjusted resolution of image data 16 may be increased, decreased, or the same as the original resolution of image data 16 for image frame 28. Sub-frame generation unit 36 generates image sub-frames 30 with a resolution which matches the resolution of display device 26.

Image sub-frames 30 are each of an area equal to image frame 28. Sub-frames 30 each include a plurality of columns and a plurality of rows of individual pixels representing a subset of image data 16 of image 12, and have a resolution that matches the resolution of display device 26.

Each image sub-frame 30 includes a matrix or array of pixels for image frame 28. Image sub-frames 30 are spatially offset from each other such that each image sub-frame 30 includes different pixels and/or portions of pixels. As such, image sub-frames 30 are offset from each other by a vertical distance and/or a horizontal distance, as described below.

Display device 26 receives image sub-frames 30 from image processing unit 24 and sequentially displays image sub-frames 30 to create displayed image 14. More specifically, as image sub-frames 30 are spatially offset from each other, display device 26 displays image sub-frames 30 in different positions according to the spatial offset of image sub-frames 30, as described below. As such, display device 26 alternates between displaying image sub-frames 30 for image frame 28 to create displayed image 14. Accordingly, display device 26 displays an entire sub-frame 30 for image frame 28 at one time.

In one embodiment, display device 26 performs one cycle of displaying image sub-frames 30 for each image frame 28. Display device 26 displays image sub-frames 30 so as to be spatially and temporally offset from each other. In one embodiment, display device 26 optically steers image sub-frames 30 to create displayed image 14. As such, individual pixels of display device 26 are addressed to multiple locations.

In one embodiment, display device 26 includes an image shifter 38. Image shifter 38 spatially alters or offsets the position of image sub-frames 30 as displayed by display device 26. More specifically, image shifter 38 varies the position of display of image sub-frames 30, as described below, to produce displayed image 14.

In one embodiment, display device 26 includes a light modulator for modulation of incident light. The light modulator includes, for example, a plurality of micro-mirror devices arranged to form an array of micro-mirror devices. As such, each micro-mirror device constitutes one cell or pixel of display device 26. Display device 26 may form part of a display, projector, or other imaging system.

In one embodiment, image display system 10 includes a timing generator 40. Timing generator 40 communicates, for example, with frame rate conversion unit 20, image processing unit 24, including resolution adjustment unit 34 and sub-frame generation unit 36, and display device 26, including image shifter 38. As such, timing generator 40 synchronizes buffering and conversion of image data 16 to create image frame 28, processing of image frame 28 to adjust the resolution of image data 16 and generate image sub-frames 30, and positioning and displaying of image sub-frames 30 to produce displayed image 14. Accordingly, timing generator 40 controls timing of image display system 10 such that entire sub-frames of image 12 are temporally and spatially displayed by display device 26 as displayed image 14.

Figure 2C:
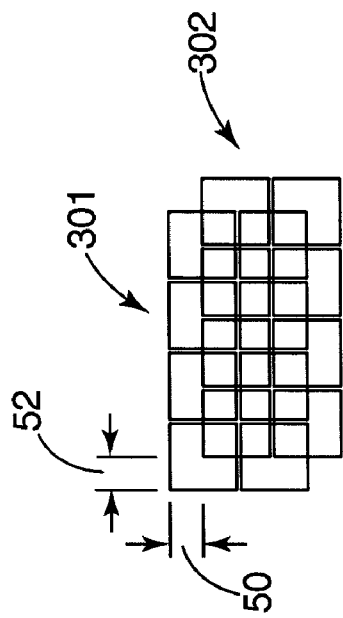
FIGS. 2A-2C are schematic diagrams illustrating the display of two sub-frames according to one embodiment of the present invention.
Figure 2B:
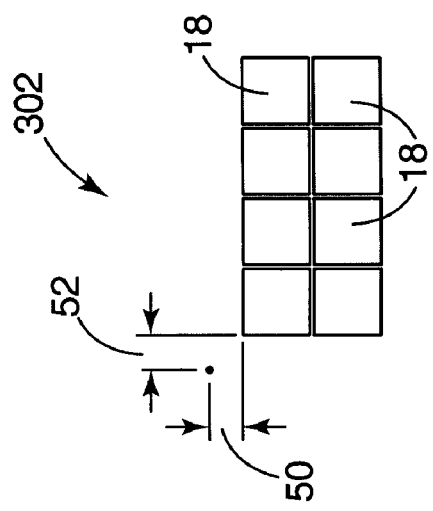
Figure 2A:
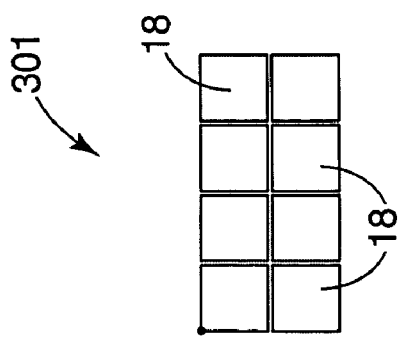

In one embodiment, as illustrated in FIGS. 2A and 2B, image processing unit 24 defines two image sub-frames 30 for image frame 28. More specifically, image processing unit 24 defines a first sub-frame 301 and a second sub-frame 302 for image frame 28. As such, first sub-frame 301 and second sub-frame 302 each include a plurality of columns and a plurality of rows of individual pixels 18 of image data 16. Thus, first sub-frame 301 and second sub-frame 302 each constitute an image data array or pixel matrix of a subset of image data 16.

In one embodiment, as illustrated in FIG. 2B, second sub-frame 302 is offset from first sub-frame 301 by a vertical distance 50 and a horizontal distance 52. As such, second sub-frame 302 is spatially offset from first sub-frame 301 by a predetermined distance. In one illustrative embodiment, vertical distance 50 and horizontal distance 52 are each approximately one-half of one pixel.

As illustrated in FIG. 2C, display device 26 alternates between displaying first sub-frame 301 in a first position and displaying second sub-frame 302 in a second position spatially offset from the first position. More specifically, display device 26 shifts display of second sub-frame 302 relative to display of first sub-frame 301 by vertical distance 50 and horizontal distance 52. As such, pixels of first sub-frame 301 overlap pixels of second sub-frame 302. In one embodiment, display device 26 performs one cycle of displaying first sub-frame 301 in the first position and displaying second sub-frame 302 in the second position for image frame 28. Thus, second sub-frame 302 is spatially and temporally displayed relative to first sub-frame 301. The display of two temporally and spatially shifted sub-frames in this manner is referred to herein as two-position processing.

In another embodiment, as illustrated in FIGS. 3A-3D, image processing unit 24 defines four image sub-frames 30 for image frame 28. More specifically, image processing unit 24 defines a first sub-frame 301, a second sub-frame 302, a third sub-frame 303, and a fourth sub-frame 304 for image frame 28. As such, first sub-frame 301, second sub-frame 302, third sub-frame 303, and fourth sub-frame 304 each include a plurality of columns and a plurality of rows of individual pixels 18 of image data 16.

In one embodiment, as illustrated in FIGS. 3B-3D, second sub-frame 302 is offset from first sub-frame 301 by a vertical distance 50 and a horizontal distance 52, third sub-frame 303 is offset from first sub-frame 301 by a horizontal distance 54, and fourth sub-frame 304 is offset from first sub-frame 301 by a vertical distance 56. As such, second sub-frame 302, third sub-frame 303, and fourth sub-frame 304 are each spatially offset from each other and spatially offset from first sub-frame 301 by a predetermined distance. In one illustrative embodiment, vertical distance 50, horizontal distance 52, horizontal distance 54, and vertical distance 56 are each approximately one-half of one pixel.

As illustrated schematically in FIG. 3E, display device 26 alternates between displaying first sub-frame 301 in a first position $P_1$, displaying second sub-frame 302 in a second position $P_2$ spatially offset from the first position, displaying third sub-frame 303 in a third position $P_3$ spatially offset from the first position, and displaying fourth sub-frame 304 in a fourth position $P_4$ spatially offset from the first position. More specifically, display device 26 shifts display of second sub-frame 302, third sub-frame 303, and fourth sub-frame 304 relative to first sub-frame 301 by the respective predetermined distance. As such, pixels of first sub-frame 301, second sub-frame 302, third sub-frame 303, and fourth sub-frame 304 overlap each other.

In one embodiment, display device 26 performs one cycle of displaying first sub-frame 301 in the first position, displaying second sub-frame 302 in the second position, displaying third sub-frame 303 in the third position, and displaying fourth sub-frame 304 in the fourth position for image frame 28. Thus, second sub-frame 302, third sub-frame 303, and fourth sub-frame 304 are spatially and temporally displayed relative to each other and relative to first sub-frame 301. The display of four temporally and spatially shifted sub-frames in this manner is referred to herein as four-position processing.

Figure 4E:
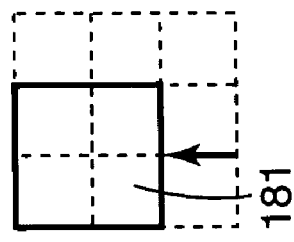
FIGS. 4A-4E are schematic diagrams illustrating the display of a pixel with an image display system according to one embodiment of the present invention.
Figure 4D:
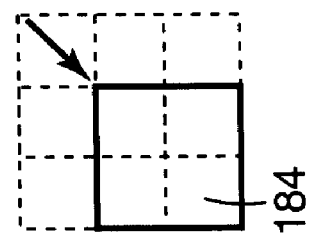
Figure 4C:
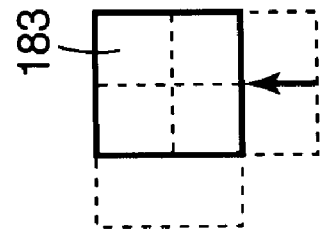
Figure 4B:
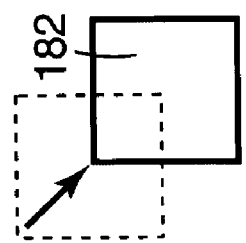
Figure 4A:
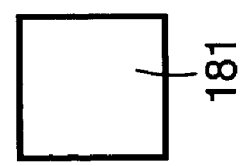

FIGS. 4A-4E illustrate one embodiment of completing one cycle of displaying a pixel 181 from first sub-frame 301 in the first position, displaying a pixel 182 from second sub-frame 302 in the second position, displaying a pixel 183 from third sub-frame 303 in the third position, and displaying a pixel 184 from fourth sub-frame 304 in the fourth position. More specifically, FIG. 4A illustrates display of pixel 181 from first sub-frame 301 in the first position, FIG. 4B illustrates display of pixel 182 from second sub-frame 302 in the second position (with the first position being illustrated by dashed lines), FIG. 4C illustrates display of pixel 183 from third sub-frame 303 in the third position (with the first position and the second position being illustrated by dashed lines), FIG. 4D illustrates display of pixel 184 from fourth sub-frame 304 in the fourth position (with the first position, the second position, and the third position being illustrated by dashed lines), and FIG. 4E illustrates display of pixel 181 from first sub-frame 301 in the first position (with the second position, the third position, and the fourth position being illustrated by dashed lines).

Sub-frame generation unit 36 (FIG. 1) generates sub-frames 30 based on image data in image frame 28. It will be understood by a person of ordinary skill in the art that functions performed by sub-frame generation unit 36 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

In one form of the invention, sub-frames 30 have a lower resolution than image frame 28. Thus, sub-frames 30 are also referred to herein as low resolution images 30, and image frame 28 is also referred to herein as a high resolution image 28. It will be understood by persons of ordinary skill in the art that the terms low resolution and high resolution are used herein in a comparative fashion, and are not limited to any particular minimum or maximum number of pixels. Sub-frame generation unit 36 is configured to use any suitable algorithm to generate pixel values for sub-frames 30.

II. Displaying Sub-frames with an Interlaced Display Device

In certain embodiments, image 12 or a sequence of images 12 may be received by image display system 10 using interlaced input data. With interlaced input data, image data 16 for an image 12 is received in two separate fields that are often referred to as an even field and an odd field. The even field includes a first portion of image data 16 that corresponds to the even horizontal lines or rows of image frame 28, and the odd field includes a second portion of image data 16 that corresponds to the odd horizontal lines or rows of image frame 28. The fields may be received by image display system 10 sequentially such that each field may be separately processed by image display system 10. Image data 16 that is received as interlaced input data is referred to herein as interlaced image data 16. In addition, image frames 28 that comprise interlaced image data 16 are referred to herein as interlaced image frames 28.

Figure 5:
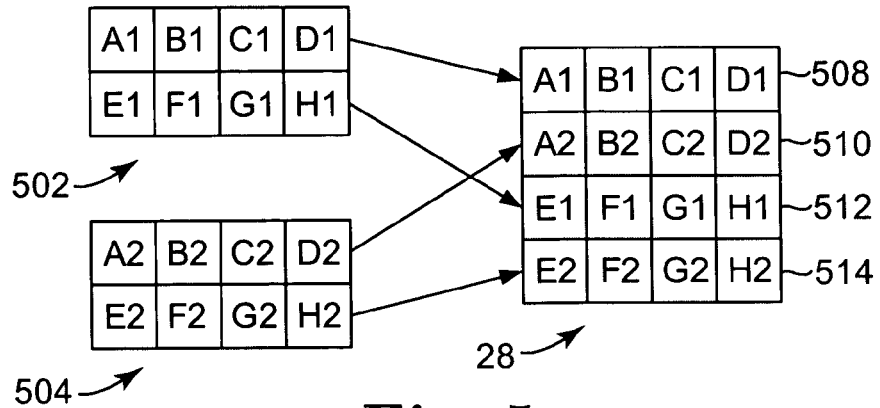
FIG. 5 is a schematic diagram illustrating a relationship between two fields and a corresponding interlaced image frame according to one embodiment of the present invention.

FIG. 5 is a schematic diagram illustrating one embodiment of a relationship between two fields 502 and 504 and a corresponding interlaced image frame 28. In the example of FIG. 5, fields 502 and 504 each comprise eight pixels of image data 16 that are arranged in a two by four array. Each field 502 and 504 comprises four vertical columns and two horizontal lines or rows of image data 16. The first line of field 502 comprises pixels A1, B1, C1, and D1, and the second line of field 502 comprises pixels E1, F1, G1, and H1. The first line of field 504 comprises pixels A2, B2, C2, and D2, and the second line of field 504 comprises pixels E2, F2, G2, and H2.

FIG. 5 illustrates a relationship between two fields 502 and 504 and the corresponding interlaced image frame 28 as it is displayed by display device 26. Interlaced image frame 28 comprises four lines 508, 510, 512, and 514 of image data 16. The first line 508 of the interlaced image frame 28 is the first line of field 502, the second line 510 of the interlaced image frame 28 is the first line of field 504, the third line 512 of the interlaced image frame 28 is the second line of field 502, and the fourth line 514 of the interlaced image frame 28 is the second line of field 504.

In response to receiving interlaced input data, image processing unit 24 generates sub-frames 30 as described below with reference to FIG. 6 according to one embodiment. Display device 26 displays sub-frames 30 as described below with reference to FIGS. 7A-7E according to one embodiment.

Figure 6:
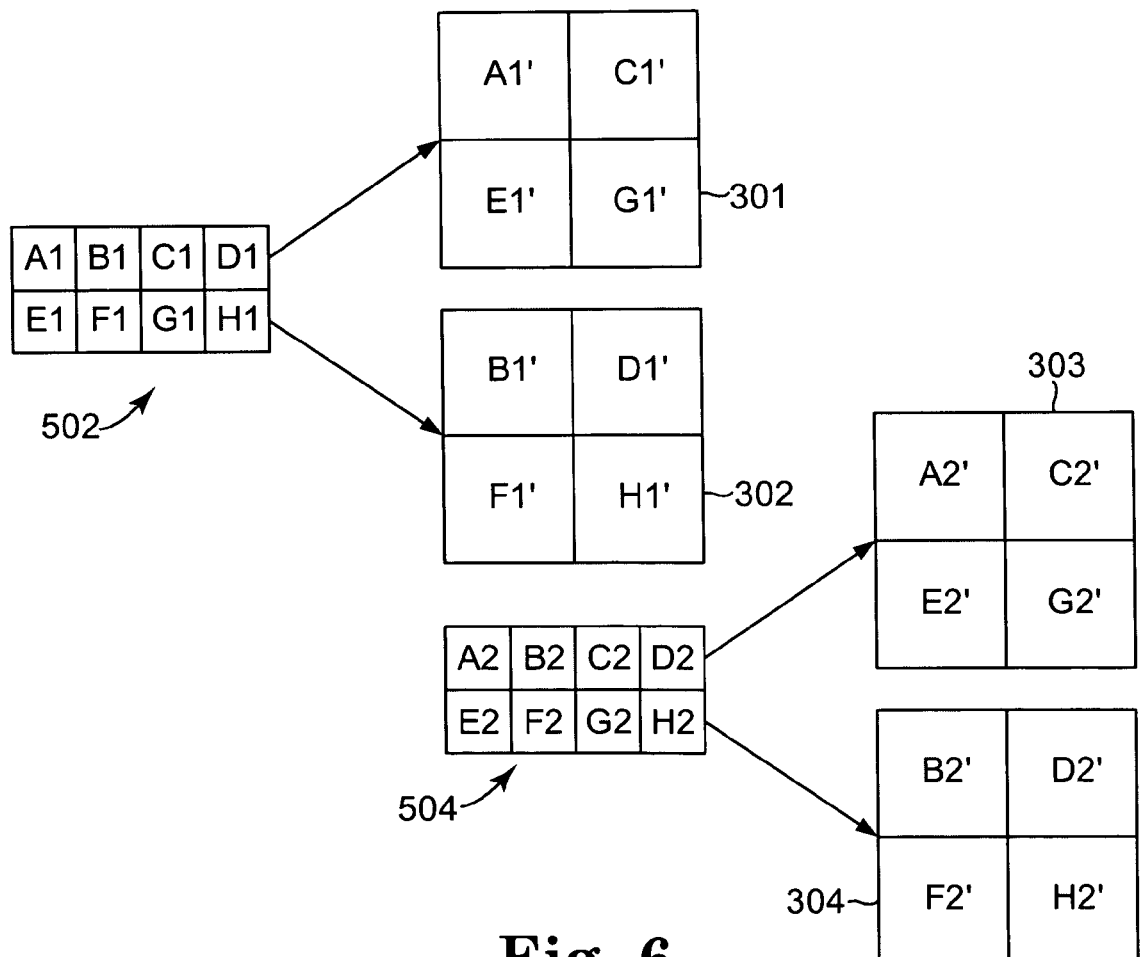
FIG. 6 is a schematic diagram illustrating a method of generating sub-frames from interlaced input data according to one embodiment of the present invention.

FIG. 6 is a schematic diagram illustrating one embodiment of a method of generating four sub-frames from interlaced input data. In the embodiment of FIG. 6, image processing unit 24 generates sub-frames 301 and 302 from field 502 and image processing unit 24 generates sub-frames 303 and 304 from field 504. Sub-frame 301 comprises pixel values A1', C1', E1', and G1', sub-frame 302 comprises pixel values B1', D1', F1', and H1', sub-frame 303 comprises pixel values A2', C2', E2', and G2', and sub-frame 304 comprises pixel values B2', D2', F2', and H2'.

In one embodiment, image processing unit 24 generates sub-frames 301 and 302 exclusively from pixel values in field 502, i.e., without using pixel values from field 504. Similarly, image processing unit 24 generates sub-frames 303 and 304 exclusively from pixel values in field 504, i.e., without using pixel values from field 502. For example, image processing unit 24 may generate pixel value A1' of sub-frame 301 using only pixel values from the first line of field 502, e.g., pixel values A1, B1, C1, and D1. Likewise, image processing unit 24 may generate pixel value H2' of sub-frame 304 using only pixel values from the second line of field 504, e.g., pixel values E2, F2, G2, and H2. In addition, processing unit 24 generates sub-frames 301, 302, 303 and 304 such that each sub-frame 301, 302, 303 and 304 comprises a total of one-half of the pixel values of each field 502 and 504, respectively.

Image processing unit 24 may generate sub-frames 301, 302, 303, and 304 using one or more of the following algorithms: a pixel selection algorithm where individual pixel values from image data 16 are selected as the sub-frame pixel values; a bilinear or other averaging algorithm where two or more pixel values from image data 16 are used to generate the sub-frame pixel values; an adaptive multi-pass algorithm where the sub-frame pixel values are generated using an iterative algorithm that generates a set of sub-frame pixel values, generates a simulated image from the sub-frame pixel values, compares the simulated image to the original image to generate error values, and generates a next set of sub-frame pixel values using the error values; or any other suitable algorithm for generating sub-frames. Additional details of the pixel selection, bilinear, and adaptive multi-pass algorithms may be found in one or more the patent applications cross-referenced above.

FIGS. 7A-7E are schematic diagrams illustrating one embodiment of displaying sub-frames generated from interlaced input data 16. In FIGS. 7A-7E, image processing unit 24 defines four image sub-frames 30 for interlaced image frame 28. More specifically, image processing unit 24 defines a first sub-frame 301, a second sub-frame 302, a third sub-frame 303, and a fourth sub-frame 304 for interlaced image frame 28. As such, first sub-frame 301, second sub-frame 302, third sub-frame 303, and fourth sub-frame 304 each include a plurality of columns and a plurality of rows of individual pixels 18 of image data 16.

Figure 7A:
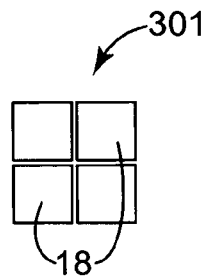
FIGS. 7A-7E are schematic diagrams illustrating the display of four sub-frames according to one embodiment of the present invention.
Figure 7B:
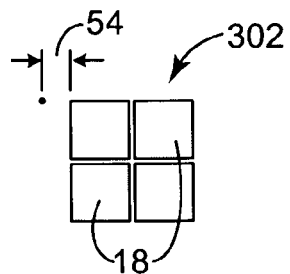
Figure 7E:
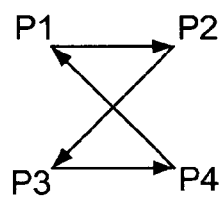
Figure 7C:
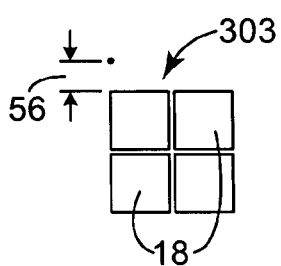
Figure 7D:
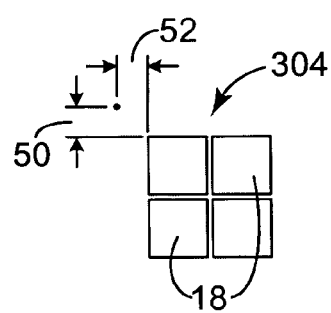

In one embodiment, as illustrated in FIGS. 7B-7D, second sub-frame 302 is offset from first sub-frame 301 by a horizontal distance 54, third sub-frame 303 is offset from first sub-frame 301 by a vertical distance 56, and fourth sub-frame 304 is offset from first sub-frame 301 by a vertical distance 50 and a horizontal distance 52. As such, second sub-frame 302, third sub-frame 303, and fourth sub-frame 304 are each spatially offset from each other and spatially offset from first sub-frame 301 by a predetermined distance. In one illustrative embodiment, vertical distance 50, horizontal distance 52, horizontal distance 54, and vertical distance 56 are each approximately one-half of one pixel.

In addition, sub-frames 301, 302, 303, and 304 are temporally offset from one another. In one embodiment, display device 26 sequentially displays sub-frames 301 and 302 during a first time period, e.g., 1/60$^{th}$ of a second or 60 Hz, and sequentially displays sub-frames 303 and 304 during a second time period, e.g. 1/60$^{th}$ of a second or 60 Hz, that is subsequent to the first time period. More particularly, display device 26 displays sub-frame 301 at a first time during the first time period, displays sub-frame 302 at a second time subsequent to the first time during the first time period, displays sub-frame 303 at a third time during the second time period that is subsequent to the second time, and displays sub-frame 304 at a fourth time during the second time period that is subsequent to the second time. The third time may be prior or subsequent to the fourth time.

As illustrated schematically in FIG. 7E, display device 26 alternates between displaying first sub-frame 301 in a first position $P_1$ at a first time, displaying second sub-frame 302 in a second position $P_2$ spatially offset from the first position at a second time that is subsequent to the first time, displaying third sub-frame 303 in a third position $P_3$ spatially offset from the first position at a third time that is subsequent to the second time, and displaying fourth sub-frame 304 in a fourth position $P_4$ spatially offset from the first position at a fourth time that is subsequent to the second time. More specifically, display device 26 shifts display of second sub-frame 302, third sub-frame 303, and fourth sub-frame 304 relative to first sub-frame 301 by the respective predetermined distance. As such, pixels of first sub-frame 301, second sub-frame 302, third sub-frame 303, and fourth sub-frame 304 overlap each other. Thus, second sub-frame 302, third sub-frame 303, and fourth sub-frame 304 are spatially and temporally displayed relative to each other and relative to first sub-frame 301.

Figure 8A:
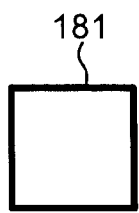
FIGS. 8A-8D are schematic diagrams illustrating the display of a pixel with an image display system according to one embodiment of the present invention.
Figure 8B:
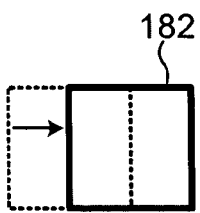
Figure 8C:
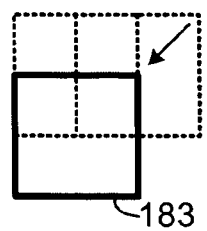
Figure 8D:
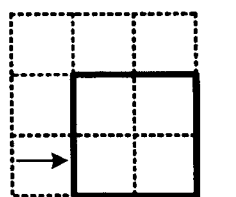

FIGS. 8A-8D illustrate one embodiment of completing one cycle of displaying a pixel 181 from first sub-frame 301 in the first position, displaying a pixel 182 from second sub-frame 302 in the second position, displaying a pixel 183 from third sub-frame 303 in the third position, and displaying a pixel 184 from fourth sub-frame 304 in the fourth position. More specifically, FIG. 8A illustrates display of pixel 181 from first sub-frame 301 in the first position, FIG. 8B illustrates display of pixel 182 from second sub-frame 302 in the second position (with the first position being illustrated by dashed lines), FIG. 8C illustrates display of pixel 183 from third sub-frame 303 in the third position (with the first position and the second position being illustrated by dashed lines), and FIG. 8D illustrates display of pixel 184 from fourth sub-frame 304 in the fourth position (with the first position, the second position, and the third position being illustrated by dashed lines).

The embodiments using interlaced input data above may provide advantages over other embodiments. For example, image generation unit 24 may generate sub-frames without de-interlacing the interlaced input data. In addition, display device 26 may include fewer pixels in embodiments where the number of pixel values in each sub-frame is less than the number of pixel values in each field of the interlaced input data. For example, display device 26 may comprise a number of pixels equal to one-fourth of the number of pixels of an interlaced image frame. Further, display device 26 may respect temporal and spatial relationships of the interlaced input data by displaying sub-frames in the positions shown in FIGS. 7A-7E. Still further, display device 26 may create the perception of square display pixels in displaying the sub-frames as shown in the pixel display positions in FIGS. 8A-8D.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of displaying an image, the method comprising:
    receiving interlaced image data for the image, the interlaced data comprising a first field and a second field;
    generating a first sub-frame and a second sub-frame for the image using the first field;
    generating a third sub-frame and a fourth sub-frame for the image using the second field; and
    alternating between displaying the first sub-frame in a first position at a first time, displaying the second sub-frame in a second position horizontally offset from the first position at a second time that is subsequent to the first time, displaying the third sub-frame in a third position vertically offset from the first position at a third time that is subsequent to the second time, and displaying the fourth sub-frame in a fourth position horizontally and vertically offset from the first position at a fourth time that is subsequent to the second time.

2. The method of claim 1 wherein the interlaced image data includes individual pixels of the image, wherein the first field of the image includes a first plurality of rows of the individual pixels of the image, and wherein the second field of the image includes a second plurality of rows of the individual pixels of the image.

3. The method of claim 2 wherein the first plurality of rows comprises a plurality of odd rows, and wherein the second plurality of rows comprises a plurality of even rows.

4. The method of claim 1 wherein the second position is horizontally offset by one-half pixel from the first position, wherein the third position is vertically offset by one-half pixel from the first position, and wherein the fourth position is horizontally offset by one-half pixel from the first position and vertically offset by one-half pixel from the first position.

5. The method of claim 1 wherein the alternating between displaying the first sub-frame in a first position, displaying the second sub-frame in a second position horizontally offset from the first position, displaying the third sub-frame in a third position vertically offset from the first position, and displaying the fourth sub-frame in a fourth position horizontally and vertically offset from the first position includes overlapping a first plurality of sub-frame pixels of the first sub-frame with a second plurality of sub-frame pixels of the second sub-frame.

6. The method of claim 5 wherein the alternating between displaying the first sub-frame in a first position, displaying the second sub-frame in a second position horizontally offset from the first position, displaying the third sub-frame in a third position vertically offset from the first position, and displaying the fourth sub-frame in a fourth position horizontally and vertically offset from the first position includes overlapping a third plurality of sub-frame pixels of the third sub-frame with a fourth plurality of sub-frame pixels of the fourth sub-frame.

7. The method of claim 6 wherein the alternating between displaying the first sub-frame in a first position, displaying the second sub-frame in a second position horizontally offset from the first position, displaying the third sub-frame in a third position vertically offset from the first position, and displaying the fourth sub-frame in a fourth position horizontally and vertically offset from the first position includes overlapping the first plurality of sub-frame pixels of the first sub-frame with the third plurality of sub-frame pixels of the third sub-frame and overlapping the second plurality of sub-frame pixels of the second sub-frame with the fourth plurality of sub-frame pixels of the fourth sub-frame.

8. A system for displaying an image, the system comprising:
a buffer configured to receive interlaced image data for the image, the interlaced image data having a first field and a second field;
an image processing unit configured to generate a first sub-frame and a second sub-frame using the first field and generate a third sub-frame and a fourth sub-frame using the second field; and
a display device configured to alternately display the first sub-frame in a first position at a first time, display the second sub-frame in a second position horizontally offset from the first position at a second time that is subsequent to the first time, display the third sub-frame in a third position vertically offset from the first position at a third time that is subsequent to the second time, and display the fourth sub-frame in a fourth position horizontally and vertically offset from the first position at a fourth time that is subsequent to the second time.

9. The system of claim 8 wherein the image processing unit is configured to generate the first sub-frame and the second sub-frame using the first field without using the second field and generate the third sub-frame and the fourth sub-frame using the second field without using the first field.

10. The system of claim 8 wherein the interlaced image data includes individual pixels of the image, wherein the first field of the image includes a first plurality of rows of the individual pixels of the image, and wherein the second field of the image includes a second plurality of rows of the individual pixels of the image.

11. The system of claim 10 wherein the first plurality of rows comprises a plurality of odd rows, and wherein the second plurality of rows comprises a plurality of even rows.

12. The system of claim 8 wherein the second position is horizontally offset by one-half pixel from the first position, wherein the third position is vertically offset by one-half pixel from the first position, and wherein the fourth position is horizontally offset by one-half pixel from the first position and vertically offset by one-half pixel from the first position.

13. The system of claim 8 wherein the interlaced image data comprises an interlaced image frame having a first number of pixels, and wherein the display device comprises a second number of pixels that is one-fourth of the first number of pixels.

14. The system of claim 8 wherein the image processing unit is configured to generate the first sub-frame, the second sub-frame, the third sub-frame, and the fourth sub-frame without de-interlacing the interlaced image data.

15. A system for displaying an image, the system comprising:
means for receiving interlaced image data for the image, the interlaced image data comprising a first field and a second field;
means for generating a first sub-frame and a second sub-frame using the first field;
means for generating a third sub-frame and a fourth sub-frame using the second field; and
means for sequentially displaying the first sub-frame in a first position during a first time period, displaying the second sub-frame in a second position horizontally offset from the first position during the first time period, displaying the third sub-frame in a third position vertically offset from the first position during a second time period that is subsequent to the first time period, and displaying the fourth sub-frame in a fourth position horizontally and vertically offset from the first position during the second time period.

16. A computer-readable medium having computer-executable instructions for performing a method of generating a first sub-frame, a second sub-frame, a third sub-frame, and a fourth sub-frame for display at spatially and temporally offset positions to generate the appearance of an image, comprising:
receiving interlaced image data associated with the image, the interlaced image data comprising a first field and a second field;
generating the first sub-frame for display at a first position using the first field;
generating the second sub-frame for display at a second position horizontally offset from the first position using the first field;
generating the third sub-frame for display at a third position vertically offset from the first position using the second field; and
generating the fourth sub-frame for display at a fourth position horizontally and vertically offset from the first position using the second field.

17. The computer-readable medium of claim 16 wherein the interlaced image data includes individual pixels of the image, wherein the first field of the image includes a first plurality of rows of the individual pixels of the image, and wherein the second field of the image includes a second plurality of rows of the individual pixels of the image.

18. The computer-readable medium of claim 17 wherein the first plurality of rows comprises a plurality of odd rows, and wherein the second plurality of rows comprises a plurality of even rows.

19. The computer-readable medium of claim 16 wherein the second position is horizontally offset by one-half pixel from the first position, wherein the third position is vertically offset by one-half pixel from the first position, and wherein the fourth position is horizontally offset by one-half pixel from the first position and vertically offset by one-half pixel from the first position.

* * * * *